United States Patent [19]

Lucadamo

[11] Patent Number: 4,602,477
[45] Date of Patent: Jul. 29, 1986

[54] MEMBRANE-AIDED DISTILLATION FOR CARBON DIOXIDE AND HYDROCARBON SEPARATION

[75] Inventor: Gene A. Lucadamo, Macungie, Pa.

[73] Assignee: Air Products and Chemicals, Inc., Allentown, Pa.

[21] Appl. No.: 741,386

[22] Filed: Jun. 5, 1985

[51] Int. Cl.[4] .......................... F25J 5/02; B01D 13/00
[52] U.S. Cl. .......................................... 62/24; 55/158; 62/28; 62/30; 62/31; 62/34; 210/640
[58] Field of Search ...................... 210/640; 55/68, 73, 55/158; 62/23-34

[56] References Cited

U.S. PATENT DOCUMENTS 4,417,449 11/1983 Hegarty et al. .......................... 62/28
4,444,571 4/1984 Matson ..................................... 55/73

OTHER PUBLICATIONS

"Membrane Separation Processes for Acid Gases", S. S. Kulkarni, E. W. Funk, N. N. Li, Aiche Summer National Meeting, Denver, 28-31, Aug. 1983.
Separation Techniques: "Membranes for Natural Gas Sweetening and $CO_2$ Enrichment", Reprinted from Chemical Engineering Progress, Oct. 1982.
"W. R. Grace & Co., Working to Make the 'Big 3' in Membranes Become the 'Big 4'". from Membrane & Separation Technology News vol. 2, No. 10, Jun. 1984. A Monthly Newsletter on Microporous RO UF ED Electrolytic & Gas Separation Technologies.
"Spiral Wound Membranes $CO_2$ Removal Process for the Wellhead" by Thomas E. Cooley to AIChE 1984 Spring National Meeting, May 21, 1984, Anaheim, California.
"Membrane Separation of $CO_2$ and $H_2S$ from Natural Gas—Field Experience", Nicholas R. Grey, William H. Mazur, Envirogenics Systems Co., El Monte, CA, to American Institute of Chemical Engineers, 1984, Spring National Meeting, Anaheim, CA, May 20-23, 1984.
"Applications of Prism Separators in Natural Gas Service" by D. J. Stookey, T. E. Graham, A. P. Aneja, to American Institute of Chemical Engineers, 1984, Spring National Meeting, Anaheim, CA May 20-23.

Primary Examiner—Frank Sever
Attorney, Agent, or Firm—Geoffrey L. Chase; E. Eugene Innis; James C. Simmons

[57] ABSTRACT

A process is described for separating a carbonaceous off-gas in a low temperature distillative separation to produce a fuel gas stream, a carbon dioxide-sulfur stream and a heavy hydrocarbon stream wherein the carbon dioxide-sulfur stream is reduced in pressure to produce refrigeration to return a portion of the fuel gas stream as reflux to the distillation, and the fuel gas stream, now at relatively higher pressure than the carbon dioxide-sulfur stream, is passed over a semi-permeable membrane selective to carbon dioxide to separate carbon dioxide from the fuel gas to combine the permeate carbon dioxide with the carbon dioxide-sulfur stream.

8 Claims, 1 Drawing Figure

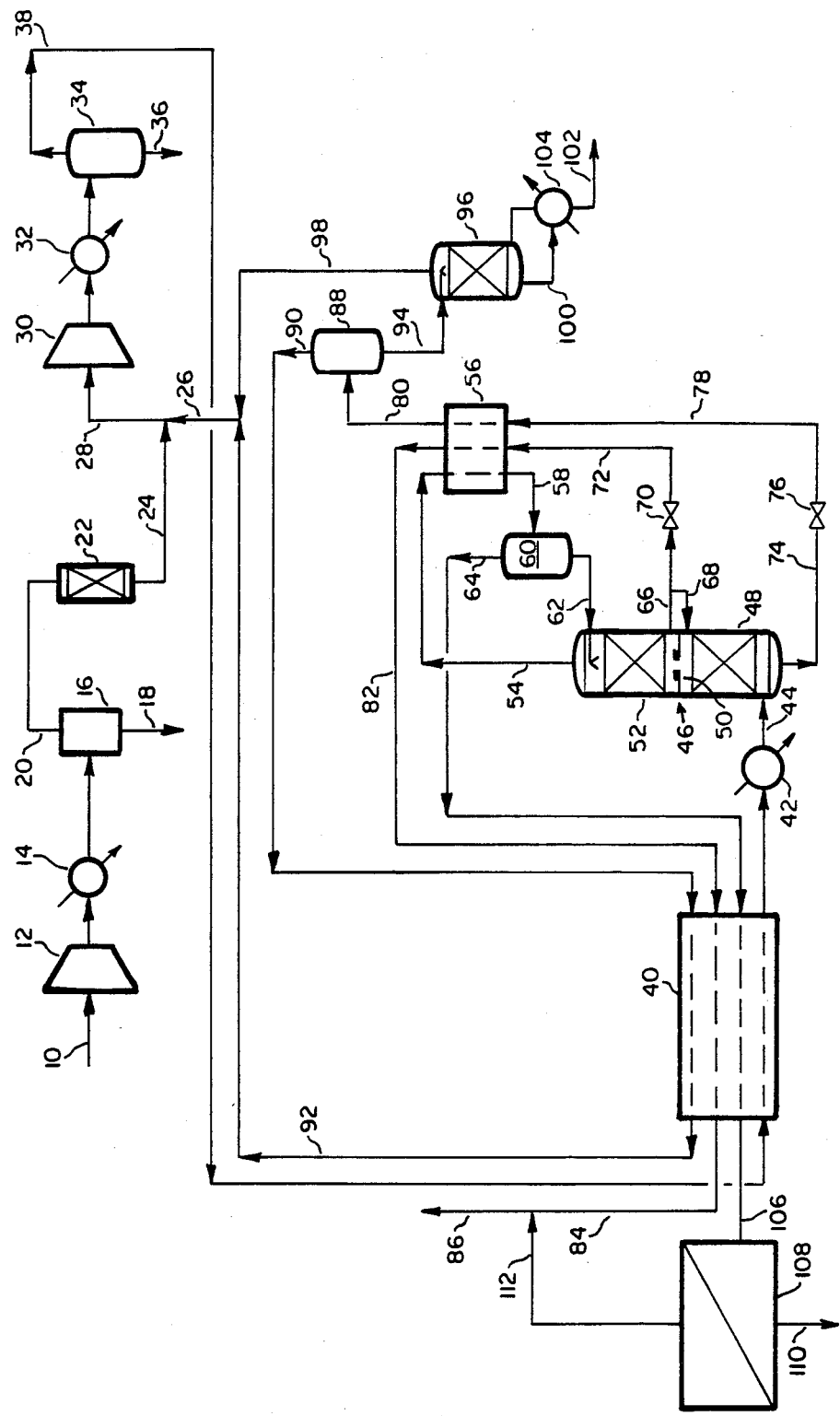

MEMBRANE-AIDED DISTILLATION FOR CARBON DIOXIDE AND HYDROCARBON SEPARATION

TECHNICAL FIELD

The present invention is directed to the field of combined semi-permeable membrane and low temperature distillative separation of a gas mixture into substantially pure gas components. More particularly, the present invention is directed to the sequential separation of a carbonaceous off-gas using low temperature distillation and subsequently semi-permeable membrane separation of the product of the disillation to produce enhanced purity fluid products of the carbonaceous off-gas.

BACKGROUND OF THE PRIOR ART

Various commercial technologies practiced in the energy production industry presently provide products or by-products containing carbon dioxide and lower molecular weight hydrocarbons. It has become desirable to recover these products and by-products of energy producing activities. Exemplary of such activities or processes are oil shale retorting, coal gasification, oxygen fireflooding, carbon dioxide miscible flood enhanced oil recovery other energy production techniques. Such techniques all provide a carbonaceous off-gas containing carbon dioxide, sulfur species including hydrogen sulfide and carbonyl sulfide, and hydrocarbons such as methane, ethane, and higher hydrocarbons, typically referred to as natural gas liquids, such as propane and heavier alkanes of the $C_4$-$C_7$ carbon number.

Separation of such carbonaceous off-gases of energy production processes has been performed in the prior art by several techniques including refrigerated distillation, extractive distillation, amine scrubbing and semi-permeable membrane separation. These techniques have various degrees of success in producing substantially pure co-products of carbon dioxide and sulfur compounds, fuel gas compounds including methane and ethane, and heavier hydrocarbons including propane and higher alkanes. Typically, it is possible to provide products separated from such carbonaceous off-gases having substantial levels of impurity or a single high purity product wherein the penalty resides in either having substantially impure co-products of the carbonaceous off-gas treatment technique or high energy input requirements to the separation.

For instance, in the technique of carbon dioxide flooding of petroleum reservoirs to enhance oil recovery, a gas containing largely carbon dioxide with lesser amounts of $C_1$-$C_7$ paraffins, water and hydrogen sulfide is produced along with the recovered oil. This gas is typically reinjected into the reservoir along with fresh makeup carbon dioxide from an external source to maintain reservoir productivity. Dehydration, sweetening and hydrocarbon removal are required to some extent for purposes of corrosion control, safe pipelining and proper miscibility of the gas with the petroleum underground. The recovery of larger amounts of valuable hydrocarbons as a by-product, however, is very attractive economically. Furthermore, production of a gaseous light hydrocarbon product of low hydrogen sulfide and carbon dioxide content is desirable, since this stream may then be burned as a fuel without environmental problems or sold via pipeline to a natural gas network. Also, high carbon dioxide recovery for reinjection is important to overall economics of the enhanced oil recovery project.

The various processes briefly outlined above have been available to the energy production industry to effect the separation of hydrocarbons from the bulk carbon dioxide in the produced gas of an enhanced oil recovery process or other energy production techniques. However, these processes are either energy or capital intensive (or both) or are unable to economically achieve a high degree of separation.

For example, in refrigerative distillation, the produced gas is partially condensed by external refrigeration to provide a liquid reflux of primarily carbon dioxide to wash propane and heavier hydrocarbons down the column. Carbon dioxide product leaves the distillation column overhead along with essentially all of the hydrogen sulfide, methane and ethane. Recovery of the propane is dependent upon the carbon dioxide loss acceptable in the hydrocarbon product leaving the bottom of the distillation column and ultimately with the fuel gas. Typically, the propane recovery is low (on the order of 20–30%). For higher hydrocarbon recovery, the refrigeration energy requirements increase significantly, such that more incremental energy is put into the process then is recovered as additional hydrocarbon product. A natural gas liquid product is also produced, consisting mainly of butane and heavier hydrocarbons.

Alternatively, the prior art has utilized extractive distillation that uses an additive, generally a $C_3$-$C_6$ alkane mixture, to effect a separation of carbon dioxide, light gas (methane and ethane) and natural gas liquids (propane and heavier hydrocarbons). High recovery of carbon dioxide, methane/ethane and $C_3$ is possible, but at the expense of high energy consumption. However, the extractive distillation processes known in the prior art are also capital intensive.

Various ethanolamine scrubbing techniques are also utilized to perform such separations wherein an amine solvent in an absorption/regeneration cycle is used to extract carbon dioxide, the bulk component, from produced gas. The processes are recited to reduce energy costs since the amine solvent regeneration is accomplished or partially accomplished by pressure reduction, rather than steam stripping as in diethanolamine systems. However, a significant energy and capital expenditure is required for enhanced oil recovery applications to compress the resulting carbon dioxide product, which is produced at low pressures before it can be utilized for reinjection at high pressure into an oil producing geologic formation. The carbon dioxide product will also contain all of the hydrogen sulfide in the feed gas. The hydrocarbon enriched gas leaving the amine absorber at high pressure must be further processed to recover any desired liquid hydrocarbon products. The steam stripped diethanolamine systems are energy intensive because of the required steam for stripping or regeneration requirements.

A typical refrigerated distillative separation of carbonaceous off-gas is set forth in U.S. Pat. No. 4,417,449 wherein carbon dioxide, a light fuel gas and a heavy hydrocarbon stream are separated in an autorefrigerated distillative separation. However, this technique results in a fuel gas having a higher than economically desirable carbon dioxide content, which lowers the BTU value of the fuel gas and a carbon dioxide stream which does not result in high recoveries of the total carbon dioxide content being processed by the distillative separation apparatus.

Various membrane techniques are presently described in the literature for separating carbon dioxide and hydrocarbons by differential rates of permeation of carbon dioxide through the membrane relative to other gas constituents. The carbon dioxide is recovered at low pressure and must be recompressed for reinjection into a carbon dioxide utilizing process, such as the enhanced oil recovery operations utilizing carbon dioxide miscible flood. Both the compressor equipment and the membrane are high capital cost items and staging of the membranes is frequently required for high carbon dioxide recovery at high purity. Typical membranes are disclosed in the following articles:

*Membrane Separation Processes For Acid Gases* by S. S. Kulkarni, E. W. Funk and N. N. Li, Corporate Research UOP, Inc., Des Plains, Ill. and R L. Riley of Fluid Systems Division UOP, Inc., San Diego, Calif., given at the AICHE Summer National Meeting, Denver, Aug. 28-31, 1983; *Separation Techniques, Membranes For Natural Gas Sweetening and Carbon Dioxide Enrichment* by William H. Mazur and Martin C. Chan, Envirogenics Systems Company, El Monte, Cailf., reprinted from Chemical Engineering Progress, October 1982; Membrane and Separation Technology News, Vol. 2, No. 10, June 1984; *Spiral Wound Membranes, Carbon Dioxide Removal Process for the Well Head,* presented by Thomas E. Cooley to AICHE 1984 Spring National Meeting, May 21, 1984, Anaheim, Calif.; *Membrane Separation of Carbon Dioxide and Hydrogen Sulfide from Natural Gas—Field Experience,* by Nicholas R. Grey and William H. Mazur, presented at the American Institute of Chemical Engineers, 1984 Spring National Meeting, Anaheim, Calif., May 20-23, 1984; *Applications of Prism TM Separators in Natural Gas Service,* by D. J. Stookey, T. E. Graham and A. P. Aneja, American Institute of Chemical Engineers, 1984 Spring National Meeting, Anaheim, Calif., May 20-23, 1984 and *SEPAREX System Makes Hydrocarbon Recovery Feasible,* by Brian D. Miller, Rudolph Richards, Mark E. Schott, 1984 Spring National Meeting American Institute of Chemical Engineers, Anaheim, Calif., May 20-23, 1984. All of these membrane separation disclosures recite the potential separation of carbon dioxide from hydrocarbons using one or more staged semipermeable membrane filters which are selective to carbon dioxide permeation, in some instances in conjunction with drying and amine or glycol contact.

However, all of the above prior art techniques either fail to provide high purity fuel and carbon dioxide products at high recoveries or require undesirable levels of capital investment or energy utilization to effect such result. The present invention disclosed herein separates and recovers the majority of $C_1$-$C_7$ hydrocarbons from the bulk carbon dioxide, recovers a high percentage of the carbon dioxide for reinjection or reutilization and achieves acceptable product specifications in a manner which requires less energy and capital than competing processes. This unique combination of separatory techniques using low temperature temperature distillation and semi-permeable membrane separation of initial products taking advantage of differential product stream pressures provides desirable product purity and high recovery of components of carbonaceous off-gas, such as is typically required for carbon dioxide miscible flood enhanced oil recovery operations.

BRIEF SUMMARY OF THE INVENTION

The present invention is a process for the low temperature distillative separation of a carbonaceous off-gas into a heavy hydrocarbon stream, a high purity fuel gas product and a high purity carbon dioxide-sulfur stream product wherein the fuel gas product is enriched in fuel gas components and the carbon dioxide-sulfur stream product is enriched in carbon dioxide by further separation in a semi-permeable membrane, comprising the steps of compressing and aftercooling an off-gas containing acid gases, light fuel gases and heavy hydrocarbons, drying the off-gas to remove moisture and subcooling the off-gas against an external refrigeration source and by heat exchange with product streams, initially separating the off-gas at low temperature in a distillation column to recover an initial fuel gas stream as an overhead fraction. a carbon dioxide-sulfur stream as a sidestream fraction, and a heavy hydrocarbon-containing stream as a bottom fraction, expanding the carbon dioxide-sulfur stream and potentially the heavy hydrocarbon stream to a lower pressure to provide refrigeration to cool and partially liquefy the initial fuel gas stream by heat exchange, phase separating the initial fuel gas stream into a crude fuel gas product and a carbon dioxide-rich liquid stream which is recycled to the distillation column as reflux, and upgrading the purity of the crude fuel gas product and the carbon dioxide-sulfur stream by passing the relatively higher pressure crude fuel gas stream over a semi-permeable membrane selective to carbon dioxide to separate a carbon dioxide-rich permeate from the crude fuel gas stream and combining the carbon dioxide-rich permeate with the lower pressure carbon dioxide-sulfur stream to provide a final high purity fuel gas product and a high purity carbon dioxide-sulfur stream product which contains a high fraction of the carbon dioxide processed.

Preferably the heavy hydrocarbon-containing stream is phase separated and stripped into a carbon dioxide containing recycle stream which is returned to the feed to the distillation column and a final heavy hydrocarbon product containing propane and higher hydrocarbons usually $C_4$-$C_7$ alkanes.

The final high purity fuel gas product contains carbon monoxide, hydrogen, methane, ethane, nitrogen and residual carbon dioxide. The high purity carbon dioxide-sulfur stream contains carbon dioxide, hydrogen sulfide, carbonyl sulfide, minor amounts of methane and ethane and residual propane, nitrogen and butane.

Preferably, the semi-permeable membrane is a carbon dioxide selective membrane consisting of a cellulose acetate structure.

Preferably, the crude fuel gas product is at a pressure of approximately 280 psia as it comes off the distillation column and is introduced to the semi-permeable membrane separation stage, while the carbon dioxide-sulfur stream is at a pressure of approximately 80 psia after it is let down in pressure from the distillation column in order to provide refrigeration to produce reflux and before it proceeds to the junction with the carbon dioxide permeate from the semi-permeable membrane.

BRIEF DESCRIPTION OF THE DRAWING

The drawing represents a schematic flowscheme of a preferred embodiment of the present invention.

DETAILED DESCRIPTION OF THE INVENTION

The present invention is applicable to the separation of a medium BTU value (400–800 BTU/ft$^3$) fuel gas stream, a carbon dioxide and sulfur-containing stream and a heavier hydrocarbon stream from a carbonaceous off-gas from any one of a number of processes producing a carbonaceous off-gas as exemplified by the carbon dioxide miscible flood enhanced oil recovery off-gas composition set forth in Table I below.

TABLE I

| | |
|---|---|
| $CO_2$ | 80.0% |
| $CH_4$ | 9.3% |
| $C_2H_6$ | 3.9% |
| $C_3H_8$ | 3.1% |
| $C_{4+}$ | 1.7% |
| $N_2$ | 1.8% |
| $H_2S$ | 0.2% |

The carbonaceous off-gas can be produced from an oil shale retorting operation, coal gasification, oxygen fireflooding or carbon dioxide miscible flood enhanced oil recovery operations. Various other energy production processes may provide similar carbonaceous off-gases containing acid gases such as carbon dioxide, and various sulfur compounds including hydrogen sulfide and carbonyl sulfide. The carbonaceous off-gas is initially separated in a low temperature distillative separation using at least some autorefrigeration in conjunction with external refrigeration into separated product streams comprising a carbon dioxide-sulfur stream containing carbon dioxide, hydrogen sulfide and carbonyl sulfide, a medium BTU fuel gas component comprising carbon monoxide, hydrogen, methane and ethane and a heavier hydrocarbon stream comprising propane, butane, and higher molecular weight hydrocarbons up to approximately $C_7$. This type of off-gas product separation has been disclosed in U.S. Pat. No. 4,417,449 hereby incorporated herein by reference. However, the present invention takes advantage of the relative pressure differential between the fuel gas product of the distillative separation and the carbon dioxide-sulfur product of the distillative separation to upgrade both such product streams by passing the fuel gas stream over a carbon dioxide selective semi-permeable membrane to further separate carbon dioxide from the fuel gas stream and recombine such carbon dioxide permeate with the carbon dioxide-sulfur stream to result in a higher purity fuel gas stream product of increased BTU value, and a higher purity carbon dioxide-sulfur stream product which results in a higher percentage recovery of carbon dioxide in the overall process whereby the carbon dioxide may be recycled to the process origin of the carbonaceous off-gas or pipelined for other carbon dioxide product duty, such as an inerting fluid.

The semi-permeable membrane which is selective to the permeation of carbon dioxide from the fuel gas stream can be selected from a broad range of such semi-permeable membranes exemplary of which is the group comprising cellulose acetate, polyacrylonitrile, polyvinyl alcohol, polytetramethylene glycol-dimethylterephthalate, polysulfone, sulfonated polysulfone bisphenol-A, polyformaldehyde, polycarbonate and polyetherimide. Any known membrane structure maybe utilized which will provide sufficient transport and surface area for the carbon dioxide of the fuel gas stream to be selectively permeated through the membrane. A typical membrane structure comprises a spiral wound composite of membrane and a channel spacer wherein the high pressure fuel gas mixture flows along the longitudinal axis of the spiral wound membrane and channel spacer composite, while the carbon dioxide permeate is transported radially inward toward the central longitudinal axis of the spiral wound membrane element and eventually enters a multiperforated permeate tube comprising the central longitudinal axis of the spiral wound membrane element whereby the carbon dioxide permeate is removed from the central longitudinal permeate tube while the residual fuel gas components pass over the spiral wound membrane and both are collected in separate downstream manifolds. Such a membrane structure is set forth in the article *SEPAREX System Makes Hydrocarbon Recovery Feasible*, by B. D. Miller, et al., the paper given at the American Institute of Chemical Engineer 1984 Spring National Meeting, Anaheim, Calif., May 20–23, 1984, paper number 9a. However, other membrane structures can be contemplated to the extent that they allow for carbon dioxide to be selectively permeated out of a fuel gas stream for collection, and they are contemplated for utilization in the present invention.

The present invention will now be described in greater detail with reference to a preferred embodiment as illustrated in the drawing. An off-gas at the influent line 10 has a pressure of 14 psia and a temperature of 100° F. (38° C.). The off-gas is initially processed in a compression and aftercooling process stage wherein the gas is compressed in compressor 12 and aftercooled in refrigeration or cold water heat exchanger 14 before passing into a separator vessel 16 to remove condensed moisture and hydrocarbon condensibles in line 18. The partially dried off-gas in line 20 is then passed through a dryer 22 which removes residual moisture in the off-gas. The fully dried off-gas in line 24 is then combined with a recycle stream from the downstream process in line 26 to provide a combined feed stream in line 28. The dryer 22 can typically comprise a set of cycling adsorbent columns charged with dessicant, such as alumina, or alternately can comprise a glycol wash unit. Both of these techniques for drying are well known in the prior art and do not require elaboration. The combined off-gas is further compressed in interstage compressor 30 and aftercooled in the aftercooling heat exchanger 32 to remove additional condensibles, such as water, in separator vessel 34 wherein the condensibles are removed in line 36. The compressed off-gas feed at 285 psia and 100° F. now in line 38 is passed to the main heat exchanger 40 and further cooled against product streams from the low temperature distillative separation. This same off-gas stream is further cooled in an auxiliary refrigeration heat exchanger 42 which comprises a typical refrigeration package utilizing a closed cycle refrigerant such as ammonia, fluorocarbons or lower hydrocarbons. The fully cooled off-gas in line 44 is then at a pressure of approximately 285 psia and a temperature of −5° F. This stream is introduced into the lower section 48 of a distillation column 46.

The distillation column is of normal construction wherein a series of trays or packed beds allow for the intermingling or rectification of ascending vapor against descending liquid for the distillative separation of various fractions. However, a trap-out plate 50 separates an upper section 52 and a lower section 48 of the column 46. The low temperature, high pressure carbonaceous off-gas feed from line 44 is separated into three initial fractions from the distillation column 46. A heavy hydrocarbon-containing stream is removed as a bottom fraction in line 74 from the lower section 48 of the column 46 and comprises propane and $C_4$–$C_7$ hydrocarbons along with carbon dioxide and small amounts of sulfur compounds. A liquid carbon dioxide-sulfur stream is removed as a sidestream fraction from trap-out plate 50 in the center of the distillation column 46, such stream being removed in line 66. This stream comprises predominantly carbon dioxide and sulfur compounds such as hydrogen sulfide and carbonyl sulfide along with residual amounts of hydrocarbons. A portion of this liquid sidestream fraction is returned to the lower section 48 of the column 46 in line 68 to provide reflux for the lower section 48. The lighter hydrocarbon portions of the carbonaceous off-gas feed to the distillation column 46 are separated in the upper section 52 of the column 46 from the bulk of the carbon dioxide and from the heavier hydrocarbons. These lighter hydrocarbons are removed as an initial fuel gas stream comprising an overhead fraction in line 54. This overhead fraction is removed at approximately 285 psia and −24° F.

In order to reflux the upper section 52 of the column 46 it is necessary to return a portion of the initial fuel gas stream to the column as reflux. To effect this return of reflux, the initial fuel gas stream is cooled in heat exchanger 56, which operates as a condenser, against the sidestream fraction and the bottom fraction which are expanded to lower pressure and temperature to provide the refrigerative source for cooling of the initial fuel gas stream in the condenser 56. The cooled, partially condensed fuel gas stream in line 58 is phase separated in vessel 60 to provide a carbon dioxide-rich liquid stream 62 which is returned to the upper section 52 of the column 46 as liquid reflux and a gas phase crude fuel gas product in line 64 at −62° F. and approximately 285 psia which is then removed from the low temperature distillative separatory stage of the process.

As recited above, the carbon dioxide-sulfur stream is expanded through expansion valve 70 to a lower pressure and temperature in line 72 comprising 85 psia and −68° F. to provide refrigeration for the reflux to the column in the condenser 56. Additional refrigeration for the condenser 56 is derived by expanding the heavy hydrocarbon-containing stream 74 through another expansion valve 76 to a lower pressure and temperature of 80 psia and −69° F. in line 78 which provides further refrigeration for the reflux to the distillation column in condenser 56.

The heavy hydrocarbon-containing stream in line 80 is then phase separated in vessel 88 to provide a gas phase stream in line 90 which is rewarmed in main heat exchanger 40 and returned in line 92 to the front end of the overall process at the interstage compressor 30. The liquid phase of the heavy hydrocarbon-containing stream from vessel 88 is removed in line 94 and introduced into a reboiled stripping column 96 wherein residual carbon dioxide and sulfides are removed as a vapor phase overhead fraction in line 98. The streams in line 92 and in line 98 are combined in line 26 and recycled to the feed carbonaceous off-gas interstage of initial feed compression. A liquid fraction from the column 96 is removed in line 100 and is sent to reboiler 104 to provide reboil vapor for the column 96. A liquid remaining heavy hydrocarbon stream is removed from reboiler 104 as a product stream 102 comprising sweet propane and higher hydrocarbons referred to as natural gas liquids comprising $C_3$–$C_7$ hydrocarbons containing only insubstantial amounts of carbon dioxide and sulfide acid gases.

The carbon dioxide-sulfur stream in line 82 at approximately 80 psia is rewarmed in the main heat exchanger 40 and recovered as a relatively lower pressure carbon dioxide and sulfur stream in line 84. The crude fuel gas product in line 64 at approximately 280 psia and −62° F. is also rewarmed in main heat exchanger 40 and recovered in line 106. This relatively higher pressure crude fuel gas stream still contains a substantial contamination of carbon dioxide and other acid gases, such as hydrogen sulfide and carbonyl sulfide. This contamination reduces the BTU value of the fuel gas and poses corrosion and environmental problems associated with acid gases for end use of the fuel gas stream. Therefore, it is desirable to take advantage of the pressure differential between the crude fuel gas stream 106 which is at relatively higher pressure (∼280 psia) than the carbon dioxide-sulfur stream in line 84 which is at relatively lower pressure (∼80 psia) to effect a passage of the residual contamination content of the fuel gas stream in line 106 to the carbon dioxide and sulfur stream in line 84. This unique pressure differential is brought about by the necessity to expand the sidestream fraction or the bottom stream fraction or both such fractions to produce refrigeration to reflux the low temperature distillation column. The end result is that process streams under such conditions provide an advantageous fit for a downstream membrane separation which drives carbon dioxide from the crude fuel gas stream to the carbon dioxide-sulfur stream by the imposed pressure differential. The result is a higher purity, higher BTU value final high purity fuel gas product having significantly reduced acid gas contamination and a higher purity, higher percent recovery carbon dioxide-sulfur stream comprising an acid gas product of the combined separatory process.

To effect this result, stream 106 is introduced into a membrane separatory stage 108 comprising a single or plurality of membranes in parallel or series arrangement wherein the semi-permeable membrane used in the membrane stage 108 is selective to the permeation of carbon dioxide from the high pressure crude fuel gas stream to a lower pressure conduit 112 which connects with the relatively lower pressure carbon dioxide-sulfur stream in line 84. Although carbon dioxide is the predominant permeate through the semi-permeable membrane, additional sulfide compounds also permeate through the membrane, as well as some residual hydrocarbon. However, the large relative carbon dioxide permeation results in a higher purity carbon dioxide-sulfur stream product in line 86 when the permeate in line 112 is combined with the carbon dioxide-sulfur stream in line 84. The permeation of carbon dioxide and sulfur compounds from the crude fuel gas stream in the membrane stage 108 results in a higher purity, final fuel gas product having increased BTU value in line 110. In light of the permeation of minor amounts of hydrocarbon through the membrane, higher recoveries than with a non-membrane separation of the prior art is not achieved. However, the combined effect of a high purity, high BTU value fuel gas product and a high recovery, high purity carbon dioxide-sulfur stream product provides a low energy adaptation of a low temperature distillative separation technique wherein the unique fit of a semi-permeable membrane separation stage downstream of the distillative separation results in enhancement of the products of the separation to an economic value which justifies the additional equipment inherent with utilization of a membrane stage in the respective product line.

The present invention described above allows for increased carbon dioxide recovery and purity and increased fuel gas purity as well as providing operating flexibility, all of which are previously unachieved in the prior art. For example, considering as a baseline of operation, the process described in U.S. Pat. No. 4,417,449, the addition of the semi-permeable membrane in the membrane stage can allow alternate process operation techniques. The distillative column could be operated as disclosed in that prior patent using the membrane stage to increase carbon dioxide recovery, and fuel gas and carbon dioxide purity as recited in the present preferred embodiment. In that case, capital expenditure of adding the present membrane stage to the process is weighted against the increased product revenues derived from the enhanced purity and recovery of the carbon dioxide and the enhanced BTU value and purity of the fuel gas products. Alternately, a practitioner could relax distillation column product purities, thus decreasing the operating costs or energy requirements of the distillative separation and allow the membrane stage to perform the remaining separation of carbon dioxide from the fuel gas fraction to return to original product specifications as set forth in the U.S. Pat. No. 4,417,449. In this alternate case, capital expenditure necessitated by the addition of the membrane stage is traded against the reduced operating cost or energy requirements of the distillative separation, rather than product revenues which remain at the same value due to the matching of the prior art product specifications and recoveries. The present invention provides this unique flexibility in the mode of operation of the overall separatory process because of the pressure differential between the fuel gas stream and the carbon dioxide-sulfur product stream and the selective permeability of carbon dioxide over hydrocarbons in the recited membranes. The utility of the present invention resides in the economic advantages of higher carbon dioxide recovery and purity and the higher BTU value of the fuel gas product derived from its higher purity and lower carbon dioxide contamination.

The present invention has been set forth with reference to preferred embodiment. However the invention should not be deemed to be limited in scope to the preferred embodiment, but rather the scope of the invention should be ascertained from the claims which follow.

I claim:

1. A process for the low temperature distillation separation of a carbonaceous off-gas into a heavy hydrocarbon stream, a high purity fuel gas product and a high purity carbon dioxide-sulfur stream product wherein the fuel gas product is enriched in fuel gas components and the carbon dioxide-sulfur stream product is enriched in carbon dioxide by further separation in a semi-permeable membrane, comprising providing a high purity fuel gas and a carbon dioxide-sulfur stream at high recoveries while minimizing capital investment and energy utilization by:

(a) compressing and aftercooling an off-gas containing acid gases, light fuel gases and heavy hydrocarbons;
   (b) drying the off-gas to remove moisture and subcooling the off-gas against an external refrigeration source and by heat exchange with product streams;
   (c) initially separating the off-gas at low temperature in a distillation column to recover an initial fuel gas stream as an overhead fraction, a carbon dioxide-sulfur stream as a sidestream fraction and an heavy hydrocarbon-containing stream as a bottom fraction;
   (d) expanding the carbon dioxide-sulfur stream and potentially the heavy hydrocarbon stream to a lower pressure to provide refrigeration to cool and partially liquefy the initial fuel gas stream by heat exchange;
   (e) phase separating the initial fuel gas stream into a crude fuel gas product and a carbon dioxide-rich liquid stream which is recycled to the distillation column as reflux; and
   (f) upgrading the purity of the crude fuel gas product and the carbon dioxide-sulfur stream by passing the relatively higher pressure crude fuel gas stream over a semi-permeable membrane selective to carbon dioxide gas to separate a carbon dioxide permeate from the crude fuel gas stream and combining the carbon dioxide gas permeate with the lower pressure carbon dioxide-sulfur stream to provide a final high purity fuel gas product and a high purity carbon dioxide-sulfur stream product.

2. The process of claim 1 wherein the heavy hydrocarbon stream is phase separated into a carbon dioxide-containing recycle stream and a final heavy hydrocarbon product.

3. The process of claim 2 wherein the recycle stream is combined with the off-gas fed to the distillation column.

4. The process of claim 1 wherein the final high purity fuel gas product contains carbon monoxide, hydrogen, methane, ethane, nitrogen and residual carbon dioxide.

5. The process of claim 1 wherein the high purity carbon dioxide-sulfur stream contains carbon dioxide, hydrogen sulfide and carbonyl sulfide and minor amounts of nitrogen and hydrocarbons.

6. The process of claim 2 wherein the final heavy hydrocarbon product contains propane and higher molecular weight hydrocarbons.

7. The process of claim 1 wherein the semi-permeable membrane is selected from the group comprising: cellulose acetate, polyacrylonitrile, polyvinyl alcohol, polytetramethylene glycol-dimethylterephthalate, polysulfone, sulfonated polysulfone bisphenol-A, polyformaldehyde, polycarbonate and polyetherimide.

8. The process of claim 1 wherein the crude fuel gas product is at a pressure of approximately 280 psia and the carbon dioxide-sulfur stream is at a pressure of approximately 80 psia.

* * * * *